United States Patent
Hong et al.

(10) Patent No.: US 10,862,684 B2
(45) Date of Patent: Dec. 8, 2020

(54) METHOD AND APPARATUS FOR PROVIDING SERVICE ON BASIS OF IDENTIFIER OF USER EQUIPMENT

(71) Applicant: Samsung Electronics Co., Ltd., Suwon-si (KR)

(72) Inventors: Dohy Hong, Fontenay sous Bios (FR); Hyeonjin Kang, Seoul (KR); Ilju Na, Seongnam-si (KR); Kitaek Bae, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 15/527,150

(22) PCT Filed: Nov. 17, 2015

(86) PCT No.: PCT/KR2015/012323
§ 371 (c)(1),
(2) Date: May 16, 2017

(87) PCT Pub. No.: WO2016/080724
PCT Pub. Date: May 26, 2016

(65) Prior Publication Data
US 2017/0338959 A1 Nov. 23, 2017

(30) Foreign Application Priority Data
Nov. 17, 2014 (KR) .................. 10-2014-0160037

(51) Int. Cl.
*H04L 9/32* (2006.01)
*H04W 4/80* (2018.01)
(Continued)

(52) U.S. Cl.
CPC .............. *H04L 9/3226* (2013.01); *H04L 9/32* (2013.01); *H04L 9/3228* (2013.01);
(Continued)

(58) Field of Classification Search
CPC ... H04W 4/02; H04W 4/70; H04W 48/00–06; H04W 48/08–14;
(Continued)

(56) References Cited

U.S. PATENT DOCUMENTS 7,231,526 B2 * 6/2007 Hon ..................... G06Q 20/367
380/262
8,051,292 B2 * 11/2011 Shen-Orr .............. H04W 12/06
713/176
(Continued)

FOREIGN PATENT DOCUMENTS

| CN | 1933650 A | 3/2007 |
| CN | 101068196 A | 11/2007 |
| CN | 100552661 C | 10/2009 |

OTHER PUBLICATIONS

Chinese Office Action dated Oct. 11, 2019, issued in Chinese Patent Application No. 201580062286.9.

*Primary Examiner* — Daniel B Potratz
*Assistant Examiner* — D'Arcy Winston Straub
(74) *Attorney, Agent, or Firm* — Jefferson IP Law, LLP

(57) ABSTRACT

The present disclosure relates to technologies for sensor networks, machine to machine (M2M) communication, machine type communication (MTC), and Internet of Things (IoT). The present disclosure may be utilized for intelligent services based on the above technologies (smart homes, smart buildings, smart cities, smart or connected cars, health care, digital education, retail businesses, security and safety-related services). The present invention relates to a method and apparatus that, when a user equipment notifies its identification information using an unsecured connection, enable the user equipment to notify the identification information in a secure manner using a one-time password (OTP)

(Continued)

algorithm and proximity authentication and to receive services customized to user needs.

16 Claims, 15 Drawing Sheets

(51) Int. Cl.
    *H04W 12/06* (2009.01)
    *H04W 48/04* (2009.01)
    *H04W 12/00* (2009.01)
    *G06Q 20/32* (2012.01)
    *H04W 4/029* (2018.01)
    *H04L 29/06* (2006.01)
    *H04W 4/70* (2018.01)

(52) U.S. Cl.
    CPC ........... *H04L 63/107* (2013.01); *H04W 4/029* (2018.02); *H04W 4/70* (2018.02); *H04W 4/80* (2018.02); *H04W 12/06* (2013.01); *H04W 48/04* (2013.01); *G06F 2221/2111* (2013.01); *G06Q 20/3224* (2013.01); *H04W 12/00503* (2019.01)

(58) Field of Classification Search
    CPC .... H04W 4/80; H04L 63/107; H04L 63/0838; H04L 63/0846; H04L 12/06–12/0609; H04L 9/3226; G06Q 20/3224
    See application file for complete search history.

(56) References Cited

U.S. PATENT DOCUMENTS

| | | | |
|---|---|---|---|
| 2003/0235305 A1* | 12/2003 | Hsu | H04W 12/0602 380/247 |
| 2004/0002897 A1 | 1/2004 | Vishik | |
| 2005/0113070 A1* | 5/2005 | Okabe | H04W 12/0602 455/411 |
| 2007/0300070 A1 | 12/2007 | Shen-Orr et al. | |
| 2009/0025072 A1 | 1/2009 | Kondo | |
| 2011/0016517 A1 | 1/2011 | Kasahara et al. | |
| 2011/0072493 A1 | 3/2011 | Morishita et al. | |
| 2013/0102335 A1* | 4/2013 | Katagi | H04W 4/029 455/457 |
| 2013/0282438 A1* | 10/2013 | Hunter | G01S 1/72 705/7.32 |
| 2014/0044259 A1 | 2/2014 | Funayama | |
| 2014/0115341 A1 | 4/2014 | Robertson | |
| 2014/0122265 A1 | 5/2014 | Mardikar et al. | |
| 2014/0137235 A1 | 5/2014 | Horton | |
| 2016/0232515 A1* | 8/2016 | Jhas | G06Q 20/3224 |

* cited by examiner

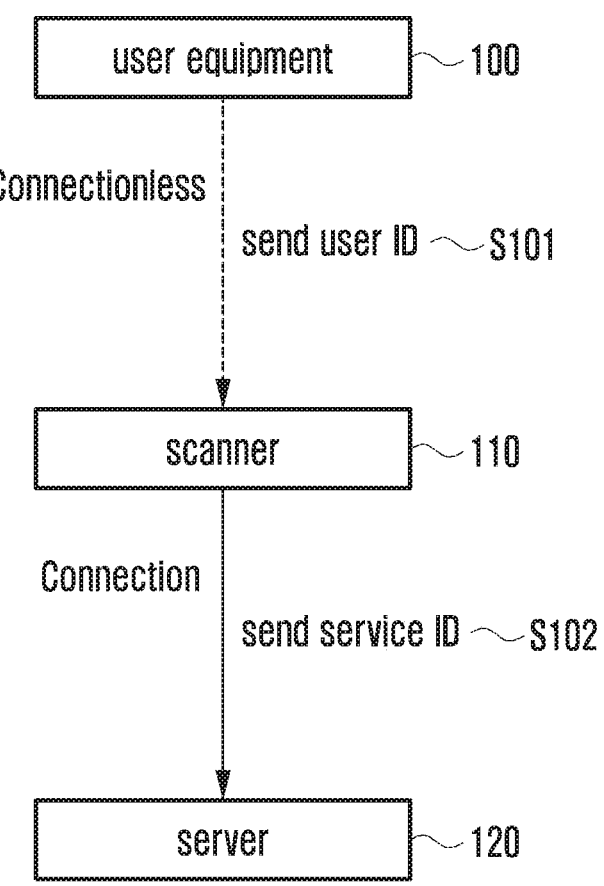

METHOD AND APPARATUS FOR PROVIDING SERVICE ON BASIS OF IDENTIFIER OF USER EQUIPMENT

TECHNICAL FIELD

The present invention relates to a communication system and, more particularly, to a method and apparatus that enable a user equipment to receive a service matching user needs on the basis of an identifier transmitted by the user equipment.

BACKGROUND ART

In recent years, the Internet is evolving from a human centered network where humans create and consume information into the Internet of Things (IoT) where distributed elements or things process and exchange information. Big data processing through cloud servers and IoT technology are being combined into the Internet of Everything (IoE). To realize IoT services, base technologies such as sensing, wired/wireless communication and network infrastructure, service interfacing and security are needed, and technologies interconnecting things such as sensor networks, Machine-to-Machine (M2M) or Machine Type Communication (MTC) are under development.

In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Meanwhile, as part of efforts to maintain the security of a system or communication network shared by many users, authentication refers to verifying the identity of a user or program so as to prevent an illegitimate user from accessing the system. For authentication, a user equipment may transmit a user identity and password to an authentication server, and the authentication server may transmit a confirmation signal indicating successful verification to the user equipment. When a user transmits the user identity and password through an unsecured connection, there is a risk that someone eavesdrops on the information being transmitted.

A one-time password (OTP) may be used to overcome such an undesirable situation. That is, user authentication may be performed using a randomly generated one-time password instead of traditional static passwords. For user authentication, a new one-time password may be generated on the basis of time-synchronization between the authentication server and the client providing the password or on the basis of the previous one-time password. One-time passwords are frequently used for user authentication in Internet-based transactions and Internet banking. User authentication may also be performed using various other secure schemes.

DISCLOSURE OF INVENTION

Technical Problem

However, when a user equipment transmits the user identity and password through unsecured wireless communication while authentication is automatically performed, a potential intruder who manages to obtain the transmitted information may perform the authentication procedure on behalf of the genuine user. Accordingly, an aspect of the present invention is to provide an authentication procedure that can address the above problem and provide a service in a manner customized to individual user's needs.

Solution to Problem

In accordance with an aspect of the present invention, there is provided a method for a user equipment to realize a service based on a user-service mapping model. The method may include: encrypting a user ID for the user equipment; transmitting the encrypted user ID to a scanner; and receiving service related information based on first information from at least one of the scanner and multiple execution devices. The encrypted user ID may be transmitted from the user equipment to the scanner, the encrypted user ID may be forwarded together with a service ID from the scanner to a server, and the encrypted user ID may be decrypted by the server into the user ID. The first information based on the user ID may be transmitted from the server to at least one of the scanner and multiple execution devices.

In accordance with another aspect of the present invention, there is provided a method for a scanner to realize a service based on a user-service mapping model. The method may include: receiving an encrypted user ID from a user equipment having encrypted a user ID into the encrypted user ID; forwarding the encrypted user ID together with a service ID to a server; receiving first information from the server; and transmitting service related information based on the user ID and the first information to the user equipment or a fixed device. The encrypted user ID may be decrypted by the server into the user ID.

In accordance with another aspect of the present invention, there is provided a user equipment capable of realizing a service based on a user-service mapping model. The user equipment may include: a transceiver to transmit and receive information to and from at least one device; and a controller to control a process of encrypting a user ID for the user equipment, transmitting the encrypted user ID to a scanner, and receiving service related information based on first information from at least one of the scanner and an execution device. The encrypted user ID may be transmitted from the user equipment to the scanner, the encrypted user ID may be forwarded together with a service ID from the scanner to a server, and the encrypted user ID may be decrypted by the server into the user ID. The first information based on the user ID may be transmitted from the server to at least one of the scanner and the execution device.

In accordance with another aspect of the present invention, there is provided a scanner capable of realizing a service based on a user-service mapping model. The scanner may include: a transceiver to transmit and receive information to and from multiple devices; and a controller to control a process of receiving an encrypted user ID from a user equipment having encrypted a user ID into the encrypted user ID, forwarding the encrypted user ID and a service ID to a server, receiving first information based on the user ID from the server, and transmitting service related information based on the first information to the user equipment or a fixed device. The encrypted user ID may be decrypted by the server into the user ID.

Advantageous Effects of Invention

In a feature of the present invention, there are provided a method and apparatus that enable a user equipment to perform an authentication procedure and receive a service customized to individual user's needs on the basis of an identifier transmitted by the user equipment.

BRIEF DESCRIPTION OF DRAWINGS

FIG. 1 illustrates a user-service mapping model forming the basis of the present invention.

MODE FOR THE INVENTION

Figure 2A:
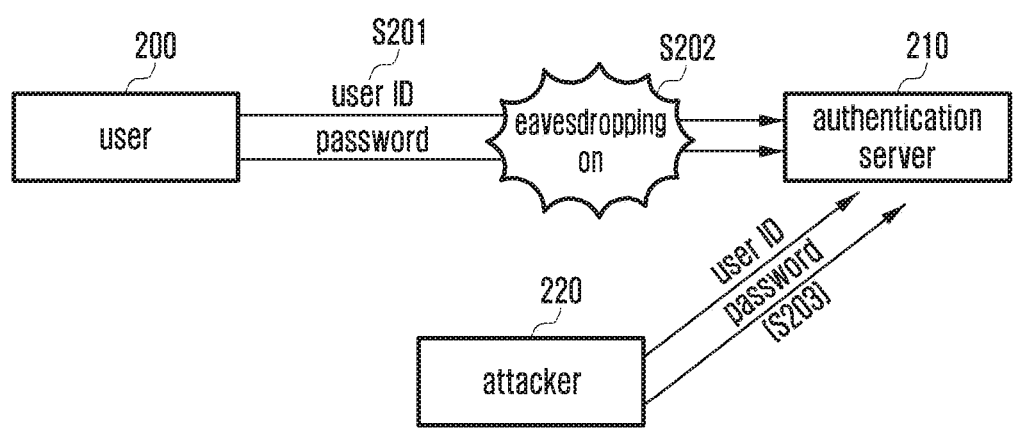
FIG. 2A depicts a replay (playback) attack that may occur in the user-service mapping model.

Hereinafter, embodiments of the present invention are described in detail with reference to the accompanying drawings. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should be construed in accordance with the spirit of the invention.

The following description of embodiments of the present invention is focused on wireless communication systems based on Bluetooth Low Energy (BLE). However, it should be understood by those skilled in the art that the subject matter of the present invention is applicable to other communication systems having similar technical backgrounds and channel configurations without significant modifications departing from the scope of the present invention.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

FIG. 1 illustrates a user-service mapping model forming the basis of the present invention.

Referring to FIG. 1, the user equipment 100 transmits a user ID (identification) to the scanner 110 and the scanner 110 identifies the user ID (S101). A user equipment is a device or terminal that can be carried and operated by a user. A user ID is a unique identifier assigned to a user. Each user may have preference settings including desired service information. At this step, the user equipment 100 may advertise the user ID at regular intervals without designating a specific receiver, and the scanner 110 may scan the user ID advertised by the user equipment 100. The scanner 110 may be fixed at a specific location. The user equipment 100 and the scanner 110 are linked to each other through an unsecured wired/wireless connection. The link between the user equipment 100 and the scanner 110 may be established through short-range wireless communication such as Bluetooth LE, Wi-Fi (wireless LAN), or Near Field Communication (NFC). Upon scanning the user ID, the scanner 110 transmits to the server 120 a service ID of a service available to the user (S102). The service ID is a unique identifier assigned to a specific service available to the user. The server 120 may verify that the requesting user is a legitimate user by use of a user ID obtained by decrypting the encrypted user ID or information generated using the user ID. If a service available to the user matches the preference settings of the user, the server 120 provides information for providing the service. The scanner 110 and the server 120 are linked to each other through a secure wired/wireless connection.

FIG. 2 illustrates two security attacks that may occur in the user-service mapping model.

FIG. 2A depicts a replay (playback) attack.

When a user 200 transmits a user ID and password to the authentication server 210 (S201), an attacker 220 may eavesdrop on the communication to intercept the user ID and password (S202). The attacker 220 may store the intercepted user ID and password, and, later, transmit the user ID and password to the authentication server 210 on behalf of the user 200 (S203), authenticating the attacker 220. Transmitting a user ID through an unsecure connection in the user-service mapping model may be vulnerable to a replay attack. This vulnerability to a replay attack can be addressed by using a different password for each authentication attempt.

Figure 2B:
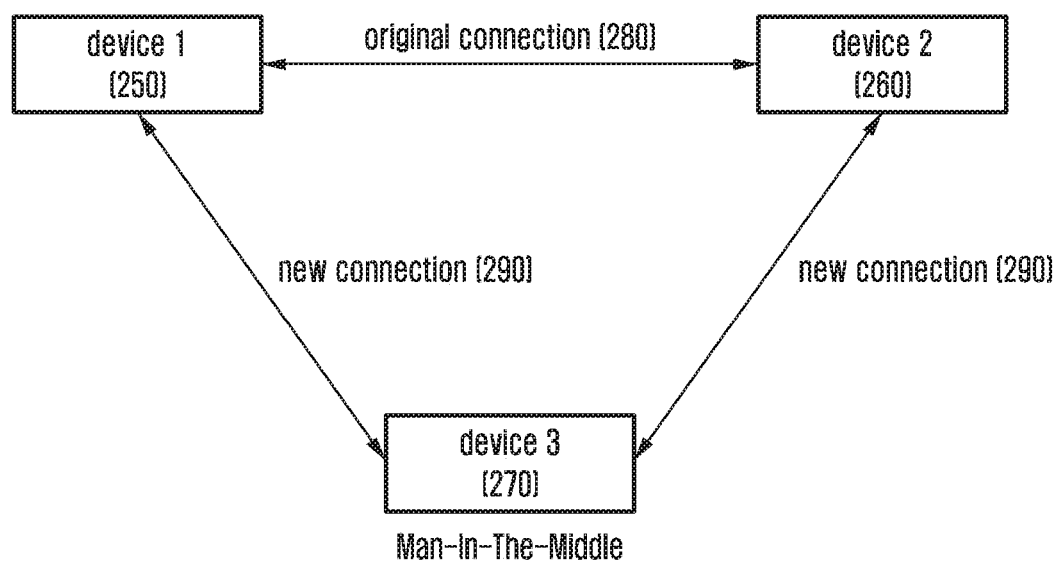
FIG. 2B depicts a man-in-the-middle (MITM) attack that may occur in the user-service mapping model.

FIG. 2B depicts a man-in-the-middle (MITM) attack.

In FIG. 2B, a first device 250 is connected with a second device 260, and this connection is referred to as the original connection 280. At this time, a third device 270 may establish a new connection 290 by impersonating the second device 260 for the first device 250 and impersonating the first device 250 for the second device 260. This is referred to as a man-in-the-middle attack, which may readily occur in long-distance wireless communication. In particular, automatic user authentication may increase the level of vulnerability to a man-in-the-middle attack. To address this problem, it is necessary to apply proximity authentication where, if two connected devices are determined not to be spatially close to each other, the connection therebetween is regarded as an illegitimate connection. Here, the distance between two connected devices may be measured using, for example, the round trip time (RTT).

Next, a description is given of a scheme that provides a service customized to user needs while resolving security problems caused by a replay attack and a man-in-the-middle attack.

Figure 3A:
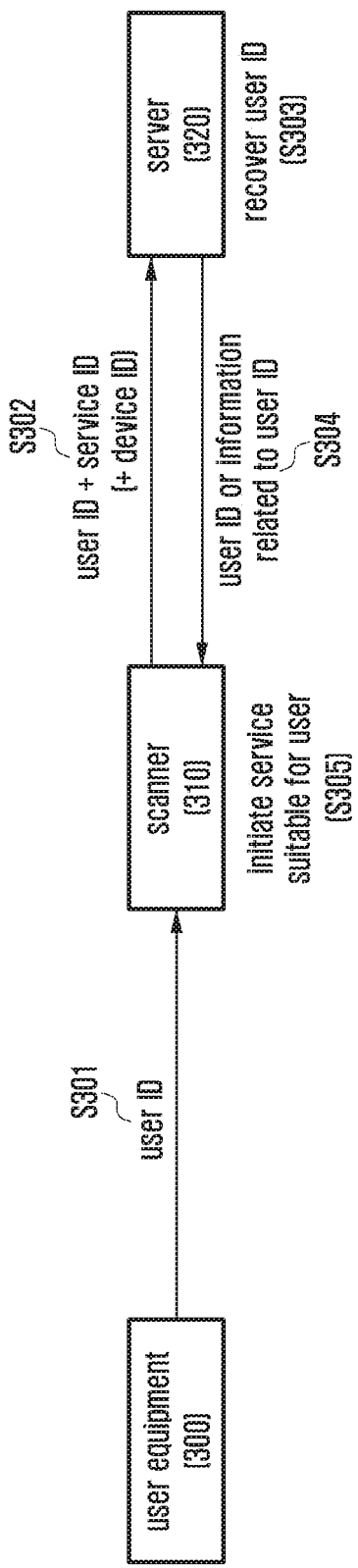
FIG. 3A illustrates a simplified configuration of a first embodiment.
Figure 3B:
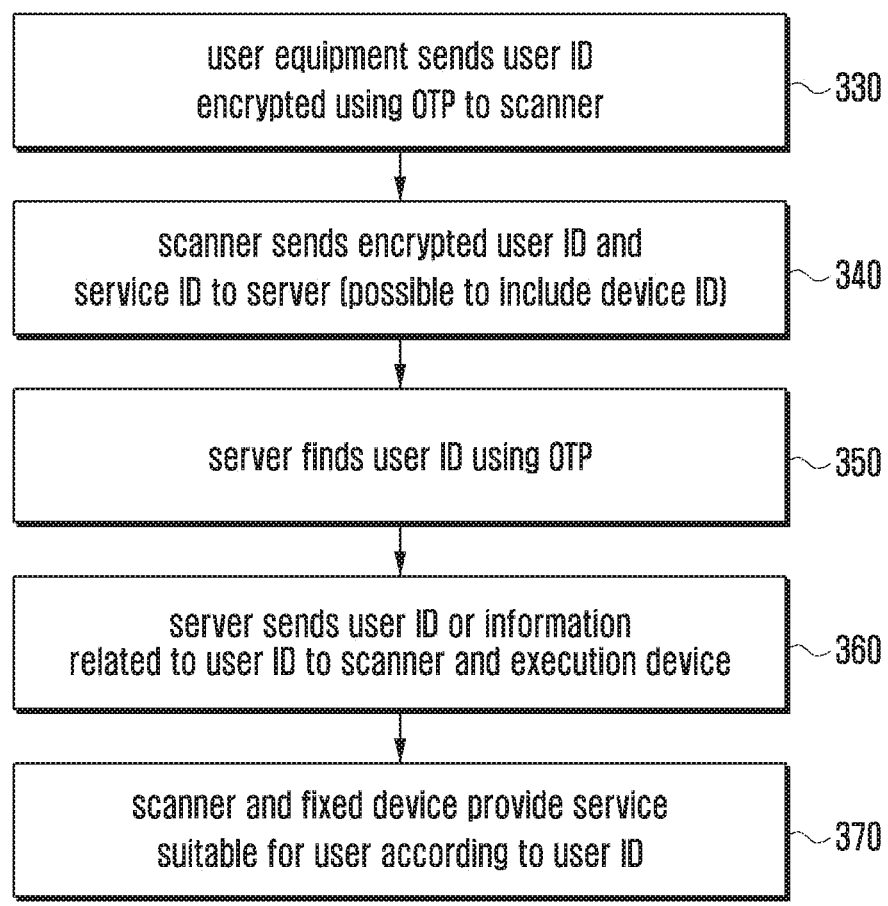
FIG. 3B is a flowchart describing the first embodiment.

FIG. 3 illustrates a first embodiment. FIG. 3A depicts a simplified configuration of the first embodiment, and FIG. 3B is a flowchart describing the first embodiment.

Referring to FIG. 3A, the user equipment 300 may transmit an encrypted user ID to the scanner 310 (S301). At this step, the user equipment 300 may advertise the encrypted user ID at regular intervals. The scanner 310 may transmit a service ID together with the encrypted user ID to the server 320 (S302). Here, the device ID of the scanner 310 may also be transmitted. The server 320 may recover the user ID by decrypting the encrypted user ID (S303). The server 320 may transmit the user ID or information generated based on the user ID to the scanner 310 (S304). Thereafter, the scanner 310 may initiate a service customized to the user according to the user ID and information related to the user ID (S305).

Referring to FIG. 3B, in the first embodiment, the user equipment may advertise a user ID encrypted using a one-time password (OTP) and the scanner may receive the encrypted user ID (330). The shared key shared between the server and the user equipment may be associated with the user ID, and the user equipment may generate an encrypted user ID in a time-synchronized manner with the server on the basis of the shared key and a time-based OTP algorithm. In this case, the encrypted user ID is periodically changed at regular intervals. Hence, although an attacker intercepts the encrypted user ID being transmitted, as the encrypted user ID is continuously changed in a time-synchronized manner, the attacker cannot use the intercepted information for being authenticated as the user at the server. Here, the user ID may be encrypted and transmitted by using various encryption algorithms.

Upon reception of the encrypted user ID, the scanner may transmit the encrypted user ID and service ID of a service available to the user to the server (340). Here, the device ID of the scanner may also be transmitted, and the server may identify the location of the scanner trying to serve the user on the basis of the device ID. The server may decrypt the encrypted user ID using the shared key (350). The server may verify that the user is a legitimate user on the basis of the decrypted user ID, and, if a service available to the user matches the user preference settings, transmit the user ID and information related to the user ID (generated based on the user ID) to the scanner and an execution device (360). Here, the server may encrypt the user ID and information related to the user ID for transmission. The server may encrypt the user ID and information related to the user ID by use of a shared key shared with the scanner. The corresponding scanner may decrypt the encrypted user ID and information related to the user ID to initiate the service customized to the user. Encryption of information transmitted from the server to the scanner may reduce the risk of exposing the user ID.

The execution device is a device for providing various services to users, and the scanner may also provide users with various services such as user ID scanning. The execution device and the scanner may provide a service customized to the user according to the received user ID (370). The user equipment or fixed device may become the target of the service provided by the execution device and the scanner and receive information for providing a service customized to the user. The information received by the user equipment or fixed device is directly related to the service provided to the user. For example, in the case of purchase of goods, information directly related to the service may include discount information and partnership coupon information.

Figure 4A:
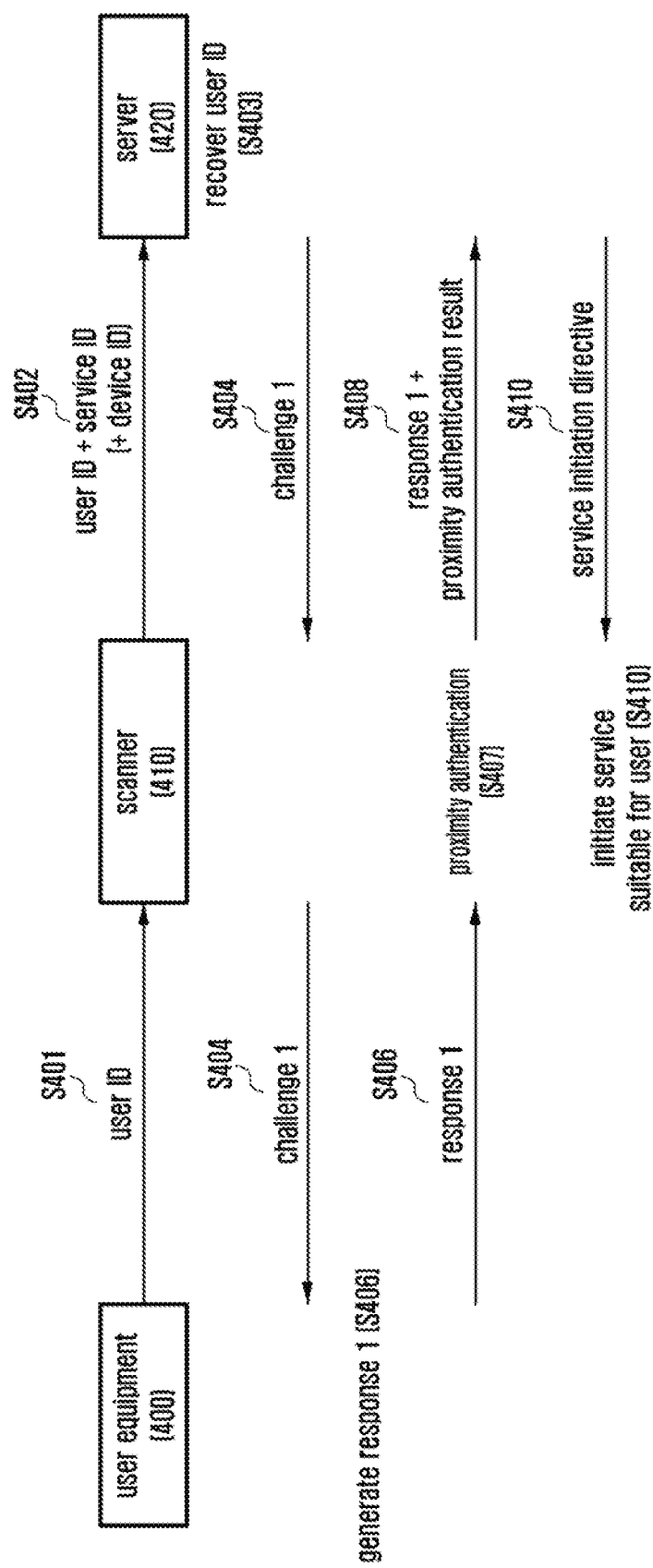
FIG. 4A illustrates a simplified configuration of a second embodiment.
Figure 4B:
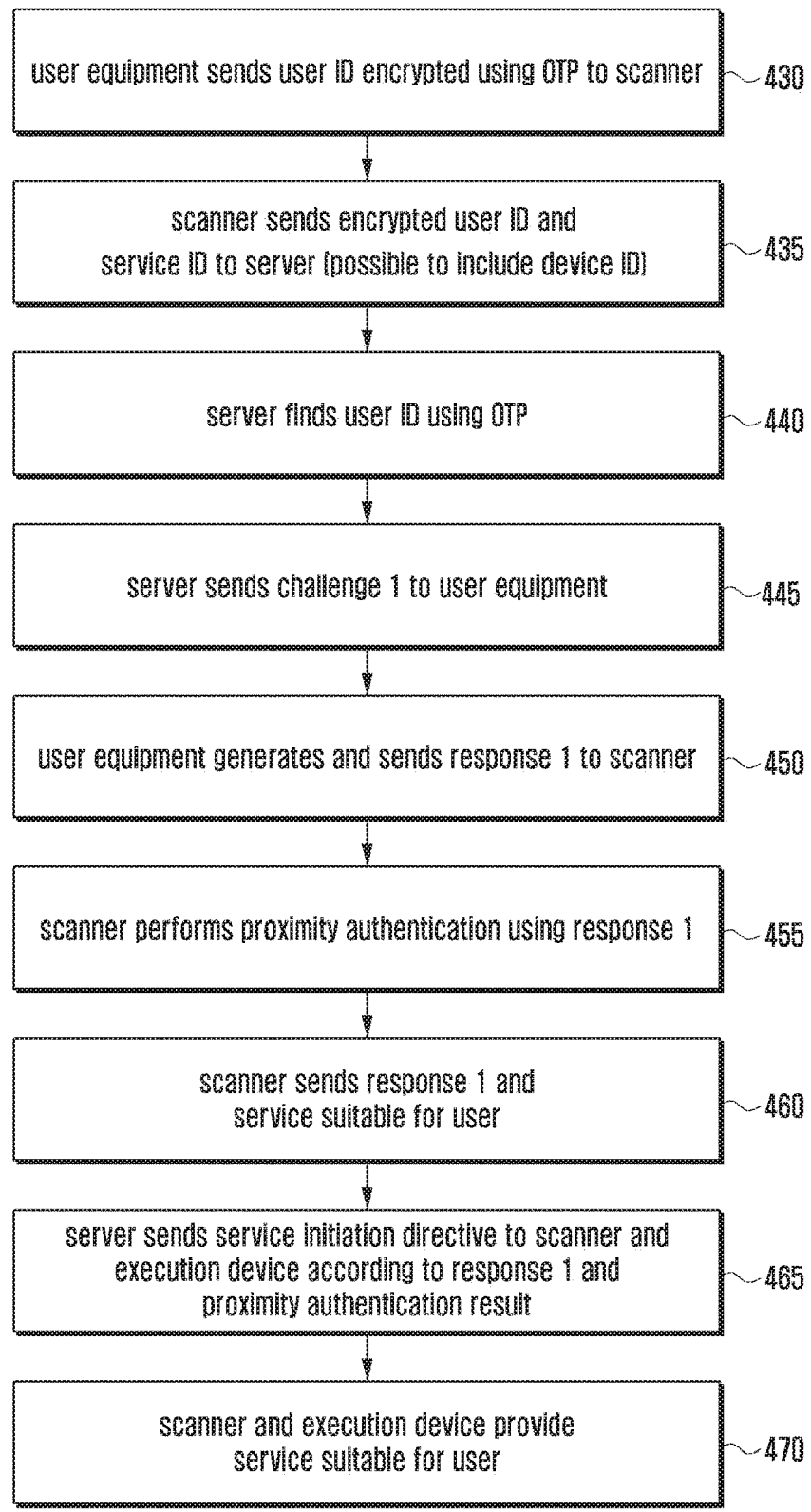
FIG. 4B is a flowchart describing the second embodiment.

FIG. 4 illustrates a second embodiment. FIG. 4A depicts a simplified configuration of the second embodiment, and FIG. 4B is a flowchart describing the second embodiment.

Referring to FIG. 4A, the user equipment 400 may transmit an encrypted user ID to the scanner 410 (S401). At this step, the user equipment 400 may advertise the encrypted user ID at regular intervals. The scanner 410 may transmit the encrypted user ID and service ID to the server 420 (S402). Here, the device ID of the scanner 410 may also be transmitted. The server 420 may recover the user ID by decrypting the encrypted user ID (S403). The server 420 may transmit a first challenge to the scanner 410 and the scanner 410 may forward the first challenge to the user equipment 400 (S404). The user equipment 400 may generate a first response for the first challenge (S406), and transmit the first response to the scanner 410 (S406). The scanner 410 may perform proximity authentication by use of the first response (S407), and transmit the first response and proximity authentication result to the server 420 (S408). The server 420 may transmit a service initiation directive to the scanner 410 according to the first response and proximity authentication result. The scanner 410 may initiate a service customized to the user (S410).

Referring to FIG. 4B, in the second embodiment, the user equipment may advertise a user ID encrypted using an OTP and the scanner may receive the encrypted user ID (430). Upon reception of the encrypted user ID, the scanner may transmit the encrypted user ID and service ID of a service available to the user to the server (435). Here, the device ID of the scanner may also be transmitted. The server may decrypt the encrypted user ID using the shared key (440). The server may verify that the user is a legitimate user on the basis of the decrypted user ID, and check whether a service available to the user matches the user preference settings. These steps are identical to those of the first embodiment.

The server may transmit a first challenge to the user equipment (445). This is to use challenge-response authentication where the user computes a value by executing a specific algorithm taking a challenge presented by the server as input and transmits the computed value as a response to the server for authentication. The server may share a shared key with the user equipment, generate a random number on the basis of a counter and the shared key, and transmit the random number as a challenge. The first challenge may be transmitted to the user equipment via the scanner. Upon reception of the first challenge, the user equipment may generate a first response for the first challenge by use of the shared key and transmit the first response to the scanner (450).

The scanner may perform proximity authentication on the basis of the RTT of the first challenge and first response. In the case where the user equipment is placed close to the scanner, assuming that the scanner transmits the first challenge at time T0, the first challenge may reach the user equipment before time T0+x (x<d/2, d<1 ms); and if the user equipment immediately generates a first response and transmits the first response to the scanner, the first response may reach the scanner before time T0+d. If the first response does not reach the scanner before time T0+d, it is probable that the user equipment having generated the first response may be a man-in-the-middle attacker other than a legitimate user placed close to the scanner. The scanner may determine whether the user having transmitted the first response is a legitimate user on the basis of the arrival time of the first response. If the first response arrives after time T0+d, the scanner may transmit a lock command to the user equipment having transmitted the first response so that the user equipment is locked. After being locked, the user equipment may request the user to enter a PIN (personal identification number) code. If the user enters a correct PIN code, the user may be again allowed to operate the user equipment.

Upon completion of proximity authentication, the scanner may transmit the proximity authentication result and first response to the server (460). If it is verified that the user equipment is in a close proximity and the first response corresponds to the first challenge, the server may transmit a service initiation directive to the scanner and the execution device (465). The service initiation directive may contain a user ID or a user ID encrypted based on the shared key (shared between the server, the scanner, and the execution device). Upon reception of the service initiation directive, the scanner or execution device may initiate a service customized to the user (470). The user equipment or fixed device may become the target of the service provided by the execution device and the scanner and receive information for providing a service customized to the user from the scanner or execution device. The information received by the user equipment or fixed device is directly related to the service provided to the user. For example, in the case of purchase of goods, information directly related to the service may include discount information and partnership coupon information.

Alternatively, when the server transmits the first challenge to the scanner, it may also transmit an encrypted first response corresponding to the first challenge. In this case, as the scanner can directly verify the validity of the first response from the user equipment and proximity of the user equipment, the scanner may immediately initiate the service customized to the user. That is, step S409 of FIG. 4A and step 465 of FIG. 4B may be skipped. Here, the first response transmitted by the server may be encrypted using a shared key shared between the server and the scanner.

Figure 5:
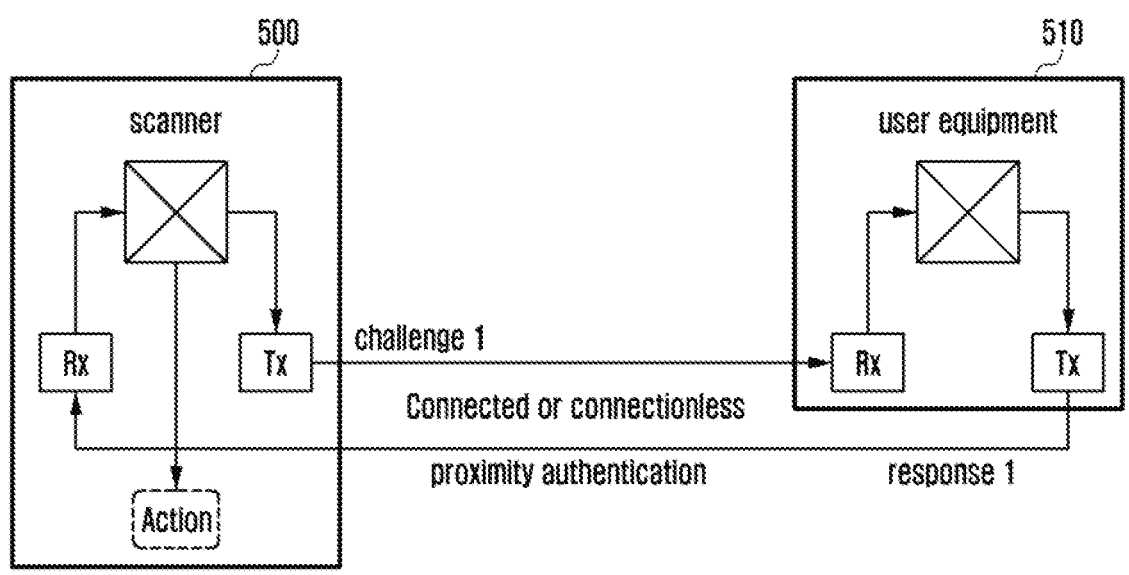
FIG. 5 illustrates devices for performing proximity authentication.

FIG. 5 illustrates devices for performing proximity authentication. The scanner 500 may transmit a first challenge to the user equipment 510 and the user equipment 510 may transmit a first response to the scanner 500, and proximity authentication may be performed using the round trip time. Proximity authentication may be performed using various other techniques. For example, to verify proximity, the user equipment may identify the location thereof using a Global Positioning System (GPS) receiver or a Wi-Fi network, and transmit the location information to the scanner. When the user equipment and the scanner each include a sound wave transceiver, the proximity of the user equipment to the scanner may be verified by measuring the round trip time of sound waves.

Next, a description is given of a scheme that permits the user to directly transmit user information to the service provider to thereby provide a service customized to user needs on the basis of the location of the user and the user-service mapping model.

Figure 6A:
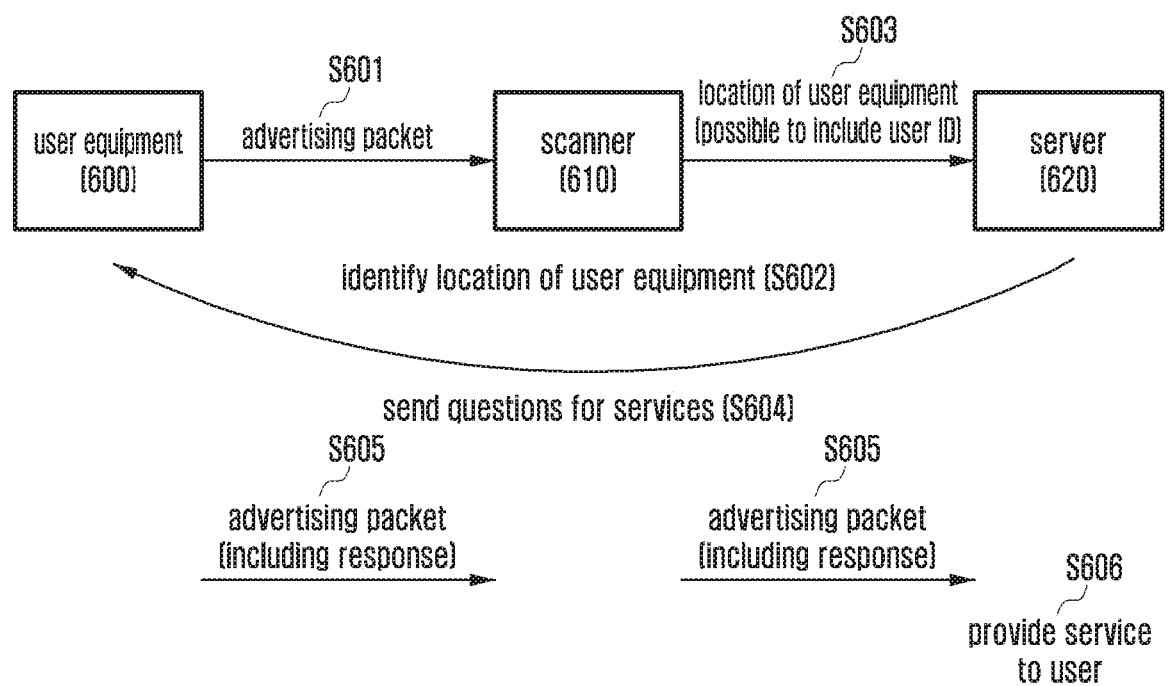
FIG. 6A illustrates a simplified configuration for providing a service customized to user needs by directly submitting user information to the service provider.
Figure 6B:
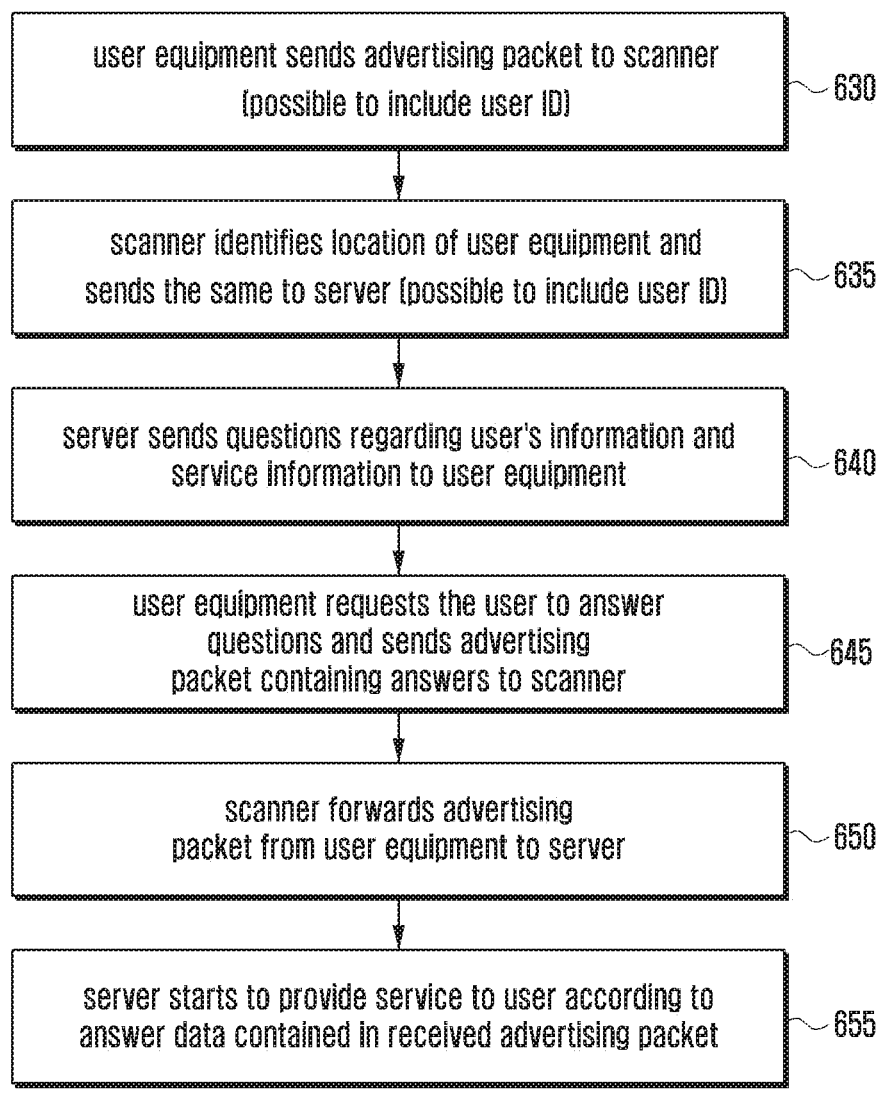
FIG. 6B is a flowchart of a method for providing a service customized to user needs by directly submitting user information to the service provider.
Figure 6C:
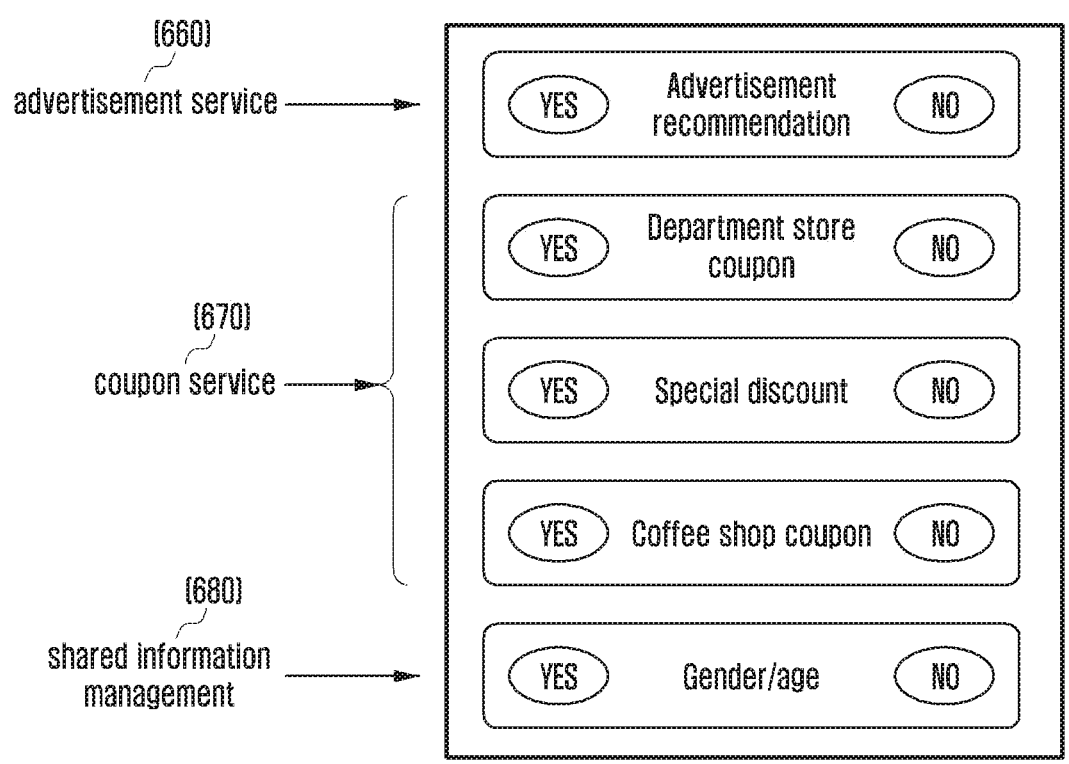
FIG. 6C is an illustration of an application enabling the user to answer questions presented by a server.

FIG. 6A illustrates a simplified configuration for providing a service customized to user needs by directly submitting user information to the service provider. FIG. 6B is a flowchart of a method for providing a service customized to user needs by directly submitting user information to the service provider. FIG. 6C is an illustration of an application enabling the user to answer questions presented by the server.

Referring to FIG. 6A, the user equipment 600 may transmit an advertising packet (S601). Here, the advertising packet may contain a user ID (or unique number) identifying the user equipment 600. Upon reception of the advertising packet, the scanner 610 may identify the location of the user equipment 600 (S602). The scanner 610 may transmit location information of the user equipment 600 to the server 620 (S603). Here, the user ID may also be transmitted. The server 620 may transmit questions for services to the user equipment 600 (S604). The user equipment 600 may transmit an advertising packet containing answers to the questions to the scanner 610 and the scanner 610 may forward the advertising packet to the server 620 (S605). The server 620 may provide a service to the user according to the answers (S606).

Referring to FIG. 6B, the user equipment may transmit an advertising packet to the scanner (630). Here, the advertising packet may contain a user ID identifying the user equipment. Upon reception of the advertising packet, the scanner may identify the location of the user equipment using a specific location measurement algorithm. Location measurement may be performed using Time of Arrival (ToA, relationship between the travel time and distance is used) or Received Signal Strength Indication (RSSI, relationship between the signal strength and attenuation during transmission is used). The scanner may transmit the identified location information of the user equipment to the server (635). Here, the user ID may be transmitted together with the location information.

Upon reception of the location information of the user equipment, the server may transmit questions, which are associated with user information that a service provider in the vicinity of the user equipment wishes to know and are associated with services provided by the service provider, to the user equipment (640). Here, the server may transmit the questions via the scanner or directly through a data network to the user equipment.

Upon reception of the questions, the user equipment may request the user to answer the questions and transmit an advertising packet containing the answers to the questions to the scanner (645). In particular, as a BLE advertising packet may contain only a small amount of data (about 20 bytes), the amount of information on the answers given by the user should be controlled accordingly. Hence, for rapid user response, it is necessary for the server to pose questions with yes or no answers as to services suitable for the user location. The scanner may forward the advertising packet from the user equipment to the server (650). Upon reception of the advertising packet, the server may provide a service suitable for the user or transmit a service initiation directive to the scanner and the execution device according to the answers contained in the advertising packet (655).

FIG. 6C is an illustration of an application enabling the user to answer questions presented by the server. In FIG. 6C, there are shown five questions with yes or no answers. The questions posed by the server includes one question about an advertisement service 660 (whether to receive a recommendation for advertisement), there are questions about a coupon service 670 (whether to receive a specific coupon), and one question about share information management 680 (whether to share user's personal information). The user may answer the questions with a YES or NO selection, and the information on the answers may be contained in an advertising packet. The specific questions may be rearranged by the server according to the location of the user equipment and may be changed depending on user settings. For example, when the location of the user equipment is identified, the server may arrange the questions so that the most recently used service at the location is selected or the service preferred by many users at the location is selected.

Next, a description is given of BLE messages usable in the user-service mapping model using Bluetooth LE (BLE).

Figure 7:
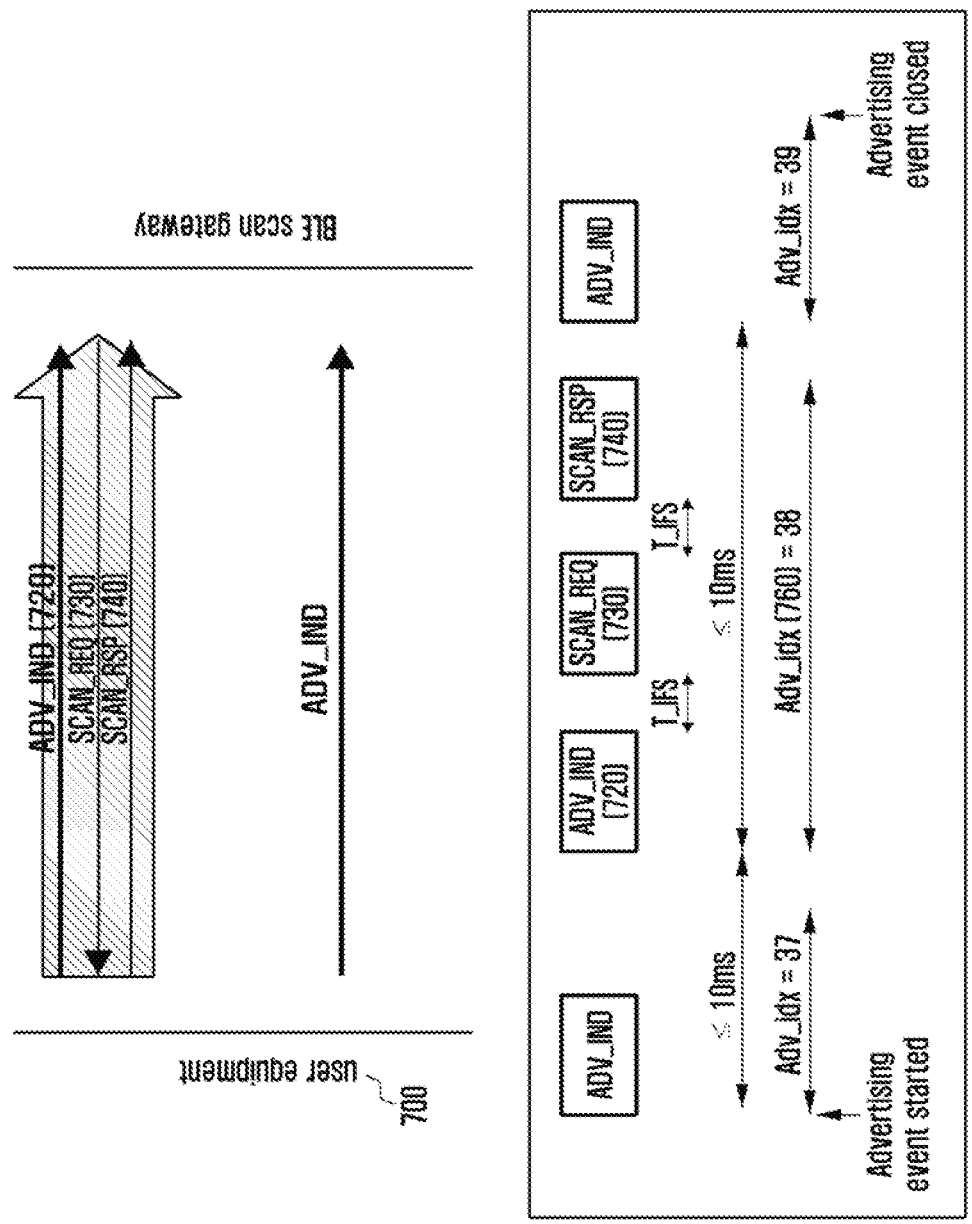
FIG. 7 illustrates operations of a Bluetooth LE (BLE) scan gateway receiving an advertising packet transmitted by the user equipment using BLE.

FIG. 7 illustrates operations of a BLE scan gateway receiving a BLE advertising packet transmitted by the user equipment.

The user equipment 700 transmits ADV_IND 720 to the BLE scan gateway. ADV_IND may be used for an advertising event whose recipient connectable through an advertising PDU is not determined (connectable undirected). ADV_IND may include the address of the user equipment. Upon reception of ADV_IND, the BLE scan gateway transmits SCAN_REQ (730). SCAN_REQ may contain the address of the BLE scan gateway and should be delivered to the user equipment within the time indicated by Time Inter Frame Space (T_IFS). Upon reception of SCAN_REQ, the user equipment 700 transmits SCAN_RSP to the BLE scan gateway (740). SCAN_RSP may include the payload size and carry the payload. These operations are performed using one Adv_idx (advertising channel index) indicated by indicia 760.

Figure 8:
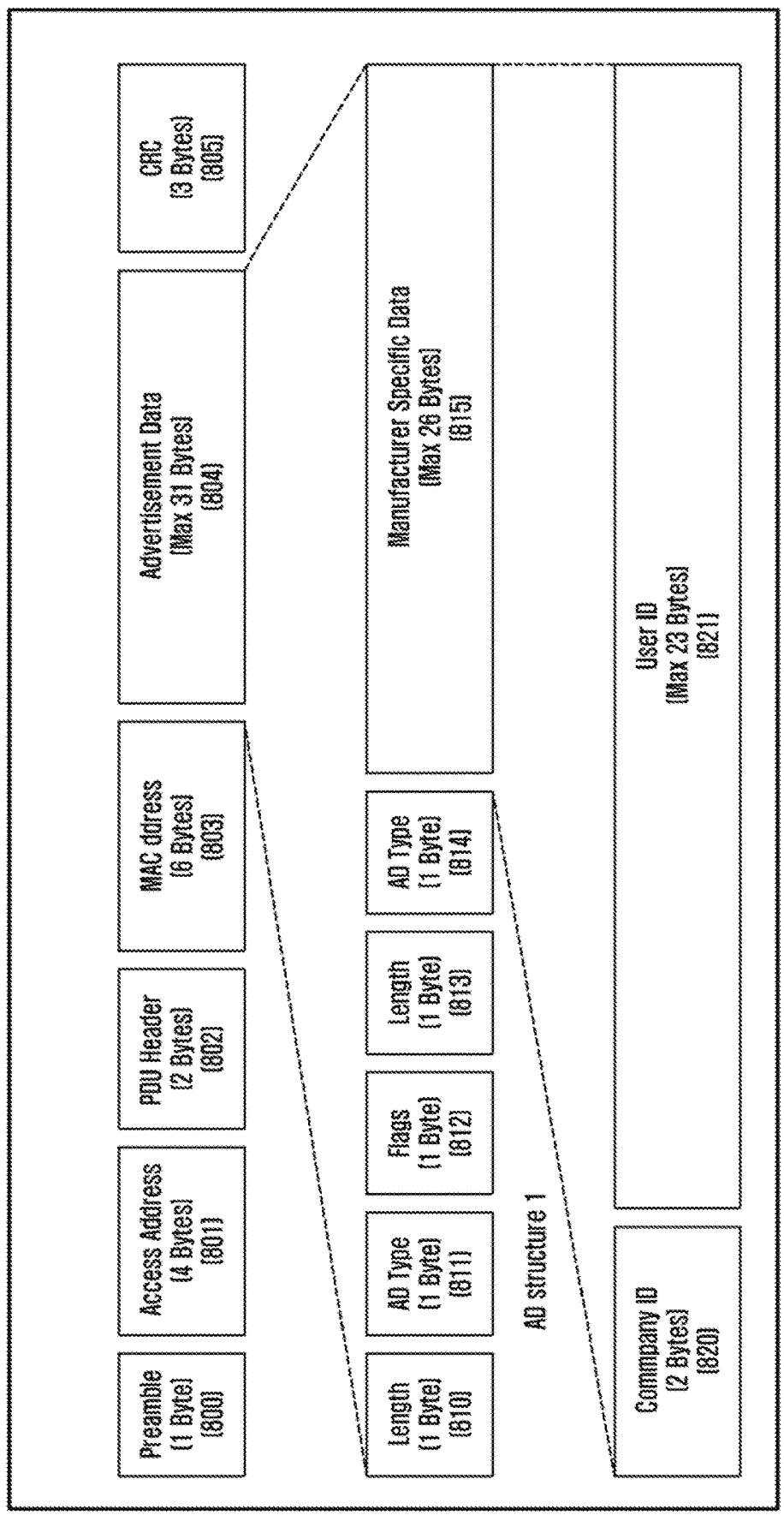
FIG. 8 illustrates the format of a BLE advertising packet transmitted by the user equipment.

FIG. 8 illustrates the format of a BLE advertising packet transmitted by the user equipment.

As shown in FIG. 8, the BLE advertising packet may include Preamble 800 of 1 byte, Access address 801 of 4 bytes, PDU header 802 of 2 bytes, MAC address 803 of 6 bytes, Advertisement data 804 of up to 31 bytes, and CRC (cyclic redundancy check, 805) of 3 bytes. Advertisement data 804 of up to 31 bytes may include a first AD structure composed of Length 810 of 1 byte, AD Type 811 of 1 byte, and Flags 812 of 1 byte, and a second AD structure composed of Length 813 of 1 byte, AD Type 814 of 1 byte, and Manufacturer Specific Data 815 of 25 bytes. Manufacturer Specific Data 815 may include Company ID 820 of 2 bytes and User ID 821 of up to 21 bytes. Here, the User ID field may be used to store a user ID generated by the OTP algorithm of the first embodiment and the second embodiment. The user equipment may generate an advertising packet containing an encrypted user ID and transmit the advertising packet to the scanner.

Figure 9:
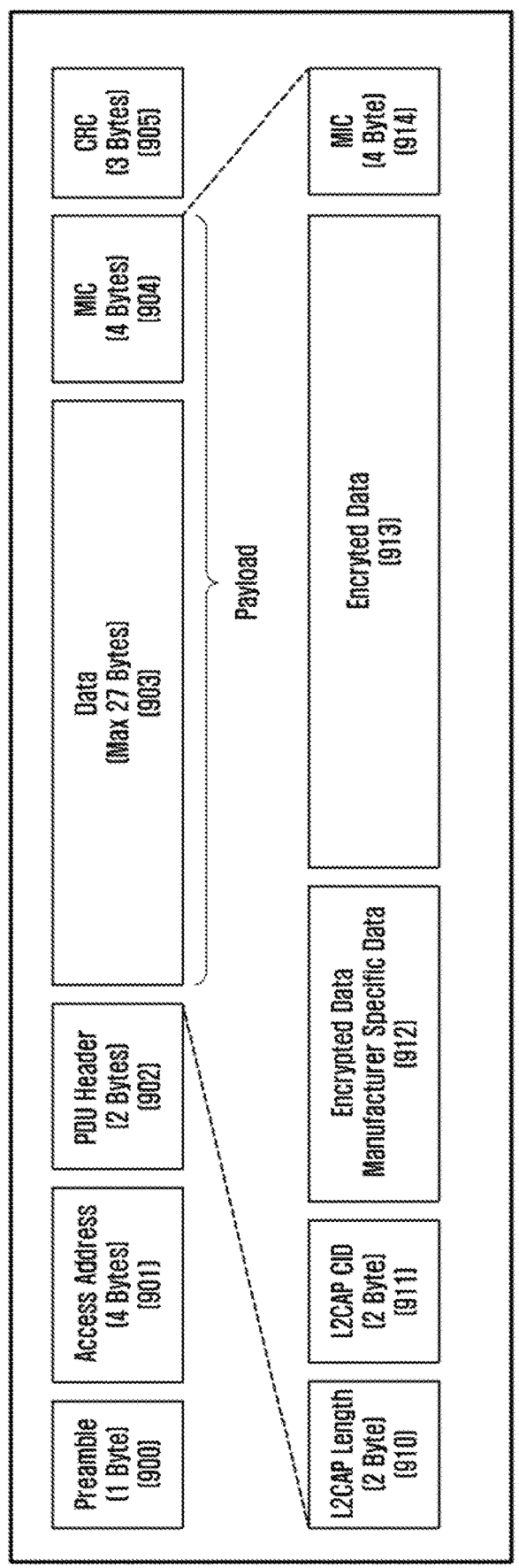
FIG. 9 illustrates the format of a BLE data packet transmitted or received.

FIG. 9 illustrates the format of a BLE data packet transmitted or received.

As shown in FIG. 9, the BLE data packet may include Preamble 900 of 1 byte, Access Address 901 of 4 bytes, PDU header 902 of 2 bytes, Data 903 of up to 27 bytes, MIC (Message Integrity Check, 904) of 4 bytes, and CRC 905 of 3 bytes. Data 903 may include L2CAP (Logical Link Control and Adaptation Protocol) Length 910 of 2 bytes, L2CAP CID (Channel Identifier) 911 of 2 bytes, Encrypted Manufacturer Specific Data 912, Encrypted Data 913, and MIC 914. The user equipment and the scanner may transmit a user ID, challenge, and response by use of BLE data packets.

Figure 10:
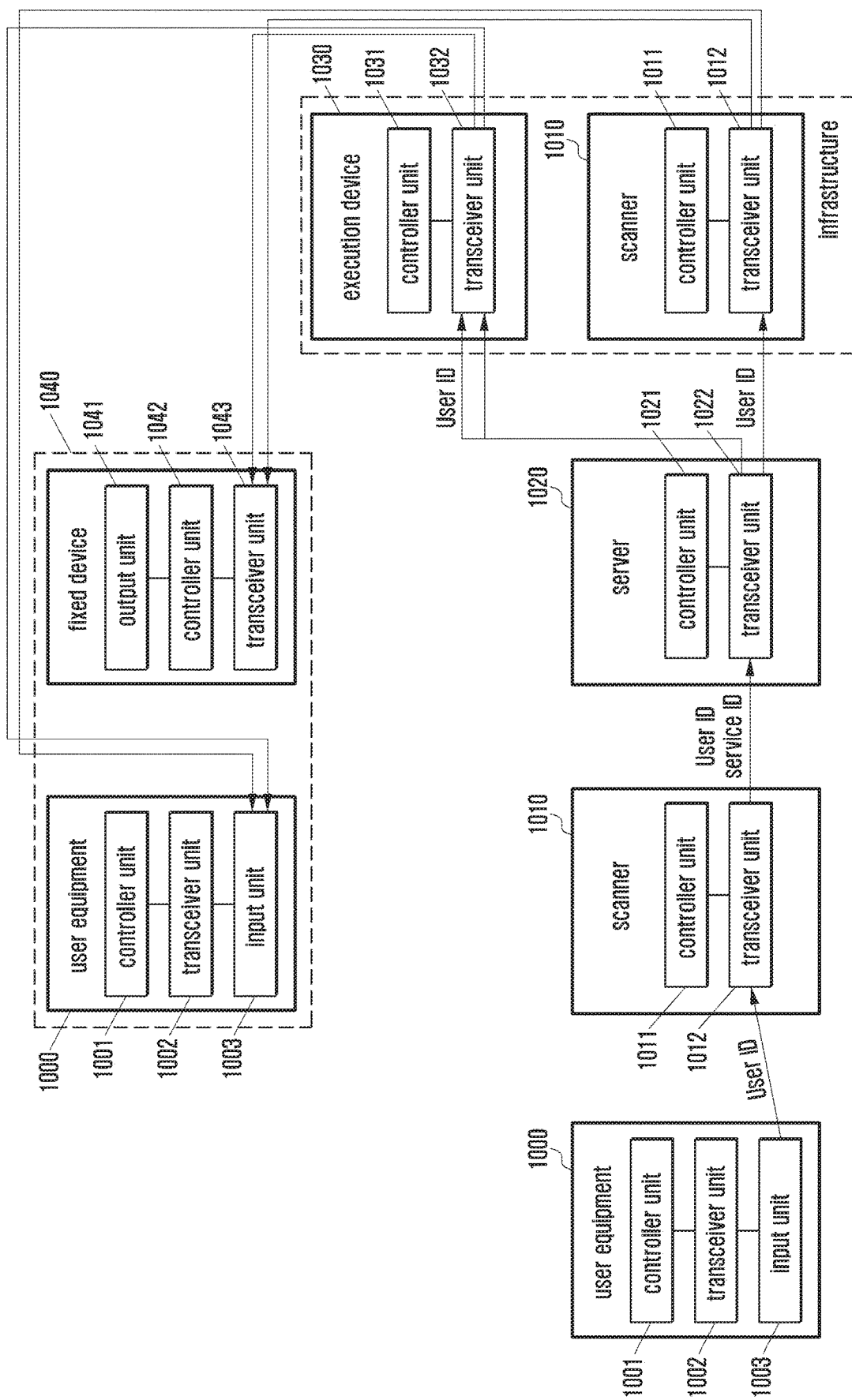
FIG. 10 is a block diagram of devices that can provide a service customized to user needs on the basis of the user-service mapping model.

FIG. 10 is a block diagram of devices that can provide a service customized to user needs on the basis of the user-service mapping model.

Referring to FIG. 10, the user equipment 1000 may include a controller unit 1001, a transceiver unit 1002, and an input unit 1003. The controller unit may control the transceiver unit to periodically transmit an advertising packet containing an encrypted user ID. The controller unit may control the transceiver unit to receive a challenge from the server 1020 and to transmit a generated response to the scanner 1010. The controller unit may control the transceiver unit and the input unit to receive questions from the server, receive answers for the questions from the user, and transmit an advertising packet containing information on the answers to the scanner.

The scanner 1010 may include a controller unit 1011 and a transceiver unit 1012. The controller unit may control the transceiver unit to scan an encrypted user ID transmitted by the user equipment. The controller unit may control the transceiver unit to transmit an encrypted user ID, service ID, and device ID to the server, and to receive a user ID and information related to the user ID from the server. The controller unit may control the transceiver unit to transmit location information of the user equipment to the server. The controller unit may control the transceiver unit to forward a challenge received from the server to the user equipment and to receive a response for the challenge from the user equipment, and may perform RTT computation for proximity authentication. Upon completion of proximity authentication, the controller unit may control the transceiver unit to transmit a notification message to the server and to receive a service initiation directive from the server. The transceiver unit may forward a message received from the server to the user equipment and may forward a message received from the user equipment to the server under the control of the controller unit. The transceiver unit may transmit service related information for direct service initiation to the user equipment or the fixed device 1040 under the control of the controller unit. The controller unit may provide a service directly to the user according to the service initiation directive or may control the transceiver unit to transmit the service initiation directive or user ID received from the server to the execution device 1030. The scanner may be wiredly or wirelessly connected with the user equipment and the server.

The server 1020 may include a controller unit 1021 and a transceiver unit 1022. The controller unit may recover a user ID by decrypting an encrypted user ID using an OTP algorithm, generate information related to the user ID on the basis of the user ID, generate a challenge using a random number, and generate questions for services in consideration of the location of the user equipment. The transceiver unit may transmit the user ID, information related to the user ID, and generated challenge to the scanner, and may transmit the questions for services to the user equipment under the control of the controller unit. The controller unit may control the transceiver unit to receive a notification message for proximity authentication from the scanner and to transmit a service initiation directive or user ID to the scanner and the execution device 1030. The controller unit may provide a service directly to the user if possible.

The execution device 1030 may include a controller unit 1031 and a transceiver unit 1032. The transceiver unit may receive a service initiation directive or user ID from the server or the scanner under the control of the controller unit. The controller unit may provide a service to the user if possible. The transceiver unit may transmit service related information for direct service initiation to the user equipment or the fixed device under the control of the controller unit.

The fixed device 1040 may include an output unit 1041, a controller unit 1042, and a transceiver unit 1043. The transceiver unit may receive service related information for direct service initiation from the scanner or the execution device under the control of the controller unit. The controller unit may control the output unit to output information directly deliverable to the user on the basis of the service related information.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A method for a user equipment to perform a service based on a user-service mapping model, the method comprising:
    encrypting a user ID for the user equipment using a time-based one time password (OTP) for broadcasting the user ID;
    transmitting the encrypted user ID to a scanner;
    receiving a first message generated using a random number which is forwarded to the user equipment by a server via the scanner in response to the transmitted encrypted user ID;
    transmitting, to the scanner, a second message which is generated based on the received first message, wherein the second message is validated using a first response message associated with the first message by the scanner, and wherein the second message is used to identify a proximity authentication between the user equipment and the scanner by the scanner; and
    receiving service related information based on the validation and proximity authentication from the scanner,
    wherein the encrypted user ID is transmitted from the user equipment to the scanner, the encrypted user ID is forwarded together with a service ID from the scanner to the server, and the encrypted user ID is decrypted by the server into the user ID,
    wherein the first response message is transmitted from the server to the scanner with the first message,
    wherein, to verify the proximity authentication, a time difference between a time when the first message is transmitted and a time when the second message is received is compared with a first threshold by the scanner, and
    wherein the proximity authentication between the user equipment and the scanner is verified as a result of the time difference being less than the first threshold, and is not verified as a result of the time difference being greater than or equal to the first threshold.

2. The method of claim 1, wherein the encrypted user ID is generated from the user ID by using an OTP algorithm based on a shared key shared between the user equipment and the server.

3. The method of claim 1, wherein the second message and information on the result of the proximity authentication are transmitted from the scanner to the server in response to the proximity authentication.

4. The method of claim 3,
    wherein a service initiation indication message is transmitted from the server to multiple execution devices for the user equipment, and
    wherein the service initiation indication message is generated based on the user ID in response to the information on the result of the proximity authentication.

5. A method for a scanner to perform a service based on a user-service mapping model, the method comprising:
    receiving an encrypted user ID from a user equipment having encrypted a user ID into the encrypted user ID by using a time-based one time password (OTP) for broadcasting the user ID;
    forwarding the encrypted user ID together with a service ID to a server;
    receiving a first message generated using a random number and a first response message which are transmitted by the server;
    transmitting the first message to the user equipment;
    receiving a second message in response to the first message from the user equipment;
    validating a validity of the second message based on the first response message associated with the first message;
    identifying a proximity authentication result between the scanner and the user equipment using the first message and the second message;
    transmitting service related information based on the validation and proximity authentication to the user equipment;
    to verify the proximity authentication, comparing a time difference between a time when the first message is transmitted and a time when the second message is received with a first threshold;
identifying that the user equipment is in proximity of the scanner as a result of the time difference being less than the first threshold; and
identifying that the user equipment is not in proximity of the scanner as a result of the time difference being greater than or equal to the first threshold,
wherein the encrypted user ID is decrypted by the server into the user ID.

6. The method of claim 5, wherein the encrypted user ID is generated from the user ID by using an OTP algorithm based on a shared key shared between the user equipment and the server.

7. The method of claim 5, further comprising:
transmitting the second message and information on the result of the proximity authentication in response to the proximity authentication to the server.

8. The method of claim 7,
wherein a service initiation indication message is transmitted from the server to multiple execution devices for the user equipment, and
wherein the service initiation indication message is generated based on the user ID in response to the information on the result of the proximity authentication.

9. A user equipment capable of performing a service based on a user-service mapping model, comprising:
a transceiver configured to transmit and receive information to and from at least one device; and
a controller coupled with the transceiver and configured to:
encrypt a user ID for the user equipment using a time-based one time password (OTP) for broadcasting the user ID,
transmit the encrypted user ID to a scanner,
receive a first message generated using a random number which is forwarded to the user equipment by a server via the scanner in response to the transmitted encrypted user ID,
transmit, to the scanner, a second message which is generated based on the received first message, wherein the second message is validated using a first response message associated with the first message by the scanner, and wherein the second message is used to identify a proximity authentication between the user equipment and the scanner by the scanner, and
receive service related information based on the validation and proximity authentication from the scanner,
wherein the encrypted user ID is transmitted from the user equipment to the scanner, the encrypted user ID is forwarded together with a service ID from the scanner to the server, and the encrypted user ID is decrypted by the server into the user ID,
wherein the first response message is transmitted from the server to the scanner with the first message,
wherein, to verify the proximity authentication, a time difference between a time when the first message is transmitted and a time when the second message is received is compared with a first threshold by the scanner, and
wherein the proximity authentication between the user equipment and the scanner is verified as a result of the time difference being less than the first threshold, and is not verified as a result of the time difference being greater than or equal to the first threshold.

10. The user equipment of claim 9, wherein the encrypted user ID is generated from the user ID by using an OTP algorithm based on a shared key shared between the user equipment and the server.

11. The user equipment of claim 9, wherein the second message and information on the result of the proximity authentication are transmitted from the scanner to the server in response to the proximity authentication.

12. The user equipment of claim 11,
wherein a service initiation indication message is transmitted from the server to multiple execution devices for the user equipment, and
wherein the service initiation indication message is generated based on the user ID in response to the information on the result of the proximity authentication.

13. A scanner capable of performing a service based on a user-service mapping model, comprising:
a transceiver configured to transmit and receive information to and from multiple devices; and
a controller coupled with the transceiver and configured to:
receive an encrypted user ID from a user equipment having encrypted a user ID into the encrypted user ID by using a time-based one time password (OTP) for broadcasting the user ID,
forward the encrypted user ID and a service ID to a server,
receive a first message generated using a random number and a first response message which are transmitted by the server,
transmit the first message to the user equipment,
receive a second message in response to the first message from the user equipment,
validate a validity of the second message based on the first response message associated with the first message,
identify a proximity authentication result between the scanner and the user equipment using the first message and the second message,
verify the proximity authentication result,
compare a time difference between a time when the first message is transmitted and a time when the second message is received with a first threshold,
identify that the user equipment is in proximity of the scanner as a result of the time difference being less than the first threshold,
identify that the user equipment is not in proximity of the scanner as a result of the time difference being greater than or equal to the first threshold, and
transmit service related information based on the validation and proximity authentication to the user equipment, wherein the encrypted user ID is decrypted by the server into the user ID.

14. The scanner of claim 13, wherein the encrypted user ID is generated from the user ID by using an OTP algorithm based on a shared key shared between the user equipment and the server.

15. The scanner of claim 13, wherein the controller is further configured to transmit the second message and information on the result of the proximity authentication in response to the proximity authentication to the server.

16. The scanner of claim 15,
wherein a service initiation indication message is transmitted from the server to multiple execution devices for the user equipment, and
wherein the service initiation indication message is generated based on the user ID in response to the information on the result of the proximity authentication.

* * * * *